United States Patent
Kang et al.

(10) Patent No.: US 11,944,940 B2
(45) Date of Patent: Apr. 2, 2024

(54) METHOD FOR PREPARATION OF WATER-TREATMENT SEPARATION MEMBRANE AND WATER-TREATMENT SEPARATION MEMBRANE PREPARED THEREBY

(71) Applicant: LG CHEM, LTD., Seoul (KR)

(72) Inventors: Hyelim Kang, Daejeon (KR); Danbi Han, Daejeon (KR); Eun Woo Cho, Daejeon (KR); Hyungjoon Jeon, Daejeon (KR); Chong Kyu Shin, Daejeon (KR); Lakwon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 16/756,962

(22) PCT Filed: Jan. 18, 2019

(86) PCT No.: PCT/KR2019/000764
§ 371 (c)(1),
(2) Date: Apr. 17, 2020

(87) PCT Pub. No.: WO2019/143182
PCT Pub. Date: Jul. 25, 2019

(65) Prior Publication Data
US 2021/0113969 A1    Apr. 22, 2021

(30) Foreign Application Priority Data

Jan. 18, 2018    (KR) ..................... 10-2018-0006486

(51) Int. Cl.
*B01D 67/00*    (2006.01)
*B01D 71/56*    (2006.01)
*C02F 1/44*    (2023.01)

(52) U.S. Cl.
CPC ......... *B01D 67/0088* (2013.01); *B01D 71/56* (2013.01); *C02F 1/44* (2013.01)

(58) Field of Classification Search
None
See application file for complete search history.

(56) References Cited

U.S. PATENT DOCUMENTS 6,805,796 B2    10/2004    Hirose et al.
6,821,430 B2 *   11/2004   Andou ................ B01D 61/025
                                                             210/321.6

(Continued)

FOREIGN PATENT DOCUMENTS

CN    107138052 A    9/2017
EP    1136116 A1     9/2001

(Continued)

OTHER PUBLICATIONS

Young-Nam Kwon, Rastko Joksimovic, In-Chul Kim, James O. Leckie, Effect of bromide on the chlorination of a polyamide membrane, Desalination, vol. 280, Issues 1-3, 2011, pp. 80-86 (Year: 2011).*

(Continued)

*Primary Examiner* — Jason M Greene
(74) *Attorney, Agent, or Firm* — BRYAN CAVE LEIGHTON PAISNER LLP

(57) ABSTRACT

Provided is a method for manufacturing a water-treatment membrane, the method including bringing an aqueous solution including free chlorine and a halogen ion into contact with a polyamide active layer, wherein the free chlorine is present in an amount from 150 ppm to 400 ppm and the halogen ion is present in an amount from 150 ppm to 400 ppm based on the aqueous solution, and a water-treatment membrane manufactured using the same.

8 Claims, 1 Drawing Sheet

(56) References Cited

U.S. PATENT DOCUMENTS

| | | | |
|---|---|---|---|
| 2003/0066805 A1 | 4/2003 | Andou et al. | |
| 2007/0227966 A1* | 10/2007 | Koo | B01D 69/02 264/41 |
| 2015/0352501 A1 | 12/2015 | Ko et al. | |
| 2018/0282186 A1 | 10/2018 | Nakamura et al. | |

FOREIGN PATENT DOCUMENTS

| | | | |
|---|---|---|---|
| EP | 1839731 A1 | 10/2007 | |
| EP | 3354333 A1 | 8/2018 | |
| JP | 63054905 A * | 3/1988 | B01D 69/125 |
| JP | H07236822 | 9/1995 | |
| JP | 2001259388 | 9/2001 | |
| JP | 2007-268530 | 10/2007 | |
| JP | 2016155067 | 9/2016 | |
| JP | 2016155074 | 9/2016 | |
| KR | 10-20070098694 | 10/2007 | |
| KR | 10-20100073795 | 7/2010 | |
| KR | 20150016019 | 2/2015 | |
| KR | 10-20160085860 | 7/2016 | |
| KR | 10-20170035814 | 3/2017 | |
| WO | 2015073170 | 5/2015 | |
| WO | 2016158633 | 10/2016 | |

OTHER PUBLICATIONS

Extended Search Report of European Patent Office in Appl'n No. 19741652.2, dated Feb. 12, 2021.

Office Action of Indian Patent Office in Appl'n No. 202017012824, dated Sep. 16, 2021.

* cited by examiner

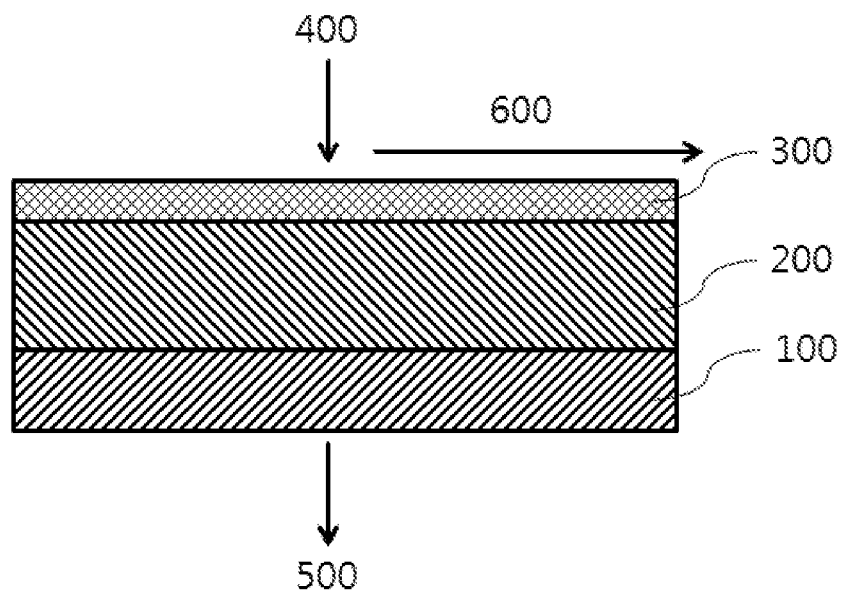

METHOD FOR PREPARATION OF WATER-TREATMENT SEPARATION MEMBRANE AND WATER-TREATMENT SEPARATION MEMBRANE PREPARED THEREBY

CROSS-REFERENCE TO RELATED APPLICATIONS

This application is a National Stage Application of International Application No. PCT/KR2019/000764 filed on Jan. 18, 2019, which claims priority to and the benefits of Korean Patent Application No. 10-2018-0006486, filed with the Korean Intellectual Property Office on Jan. 18, 2018, the entire contents of which are incorporated herein by reference.

TECHNICAL FIELD

The present specification relates to a method for manufacturing a water-treatment membrane, a water-treatment membrane manufactured using the same, a water-treatment module including the water-treatment membrane, and a water-treatment system including the water-treatment module.

BACKGROUND ART

Developing a new source of water resources has surfaced as an urgent facing challenge due to recent serious pollution of water quality environments and water shortage. Researches on the pollution of water quality environments aim for high-quality residential and industrial water, and treatment of various domestic sewage and industrial wastewater, and interests in water-treatment processes using a separation membrane with an advantage of energy saving has been rising. In addition, accelerated reinforcement on environment regulations is expected to advance wide utilization of separation membrane technologies. Traditional water-treatment processes are difficult to satisfy the tightened regulations, however, separation membrane technologies secure excellent treatment efficiency and stable treatment, therefore, are expected to become a leading technology in the field of water-treatment in the future.

Liquid separation is divided into microfiltration, ultrafiltration, nanofiltration, reverse osmosis, stannizing, active transport, electrodialysis, and the like, depending on the pore of the membrane. Among these, the reverse osmosis method refers to a process of desalinization using a semipermeable membrane permeating water but having impermeableness for salts, and when salt-dissolved high-pressure water is introduced to one side of the semipermeable membrane, salt-removed pure water comes out of the other side with a low pressure.

Specifically, typical examples of such a water-treatment membrane include a polyamide-based water-treatment membrane, and studies on increasing salt rejection or flux have been continuously ongoing.

BRIEF DESCRIPTION

Technical Problem

The present specification is directed to providing a method for manufacturing a water-treatment membrane, a water-treatment membrane manufactured using the same, a water-treatment module including the water-treatment membrane, and a water-treatment system including the water-treatment module.

Technical Solution

One embodiment of the present specification provides a method for manufacturing a water-treatment membrane including bringing an aqueous solution including free chlorine and a halogen ion into contact with a polyamide active layer, wherein a content of the free chlorine is from 150 ppm to 400 ppm and a content of the halogen ion is from 150 ppm to 400 ppm based on the aqueous solution.

In addition, one embodiment of the present specification provides a water-treatment membrane manufactured according to the method for manufacturing a water-treatment membrane described above.

One embodiment of the present specification provides a water-treatment module including one or more of the water-treatment membranes described above.

In addition, one embodiment of the present specification provides a water-treatment system including one or more of the water-treatment modules described above.

Advantageous Effects

By introducing free chlorine and a halogen element on a polyamide active layer surface, a water-treatment membrane according to one embodiment of the present specification is capable of enhancing salt rejection, boron rejection and/or flux of the water-treatment membrane.

DESCRIPTION OF DRAWINGS

FIG. 1 illustrates a water-treatment membrane according to one embodiment of the present specification.

REFERENCE NUMERALS

100: Non-woven Fabric
200: Porous Support Layer
300: Polyamide Active Layer
400: Salt Water
500: Purified Water
600: Concentrated Water

DETAILED DESCRIPTION

Hereinafter, the present specification will be described in more detail.

In the present specification, a description of a certain member being placed "on" another member includes not only a case of the certain member adjoining the another member but a case of still another member being present between the two members.

In the present specification, a description of a certain part "including" certain constituents means capable of further including other constituents, and does not exclude other constituents unless particularly stated on the contrary.

In the present specification, at % is an element content ratio, and means atomic % used in the art.

One embodiment of the present specification provides a method for manufacturing a water-treatment membrane including bringing an aqueous solution including free chlorine and a halogen ion into contact with a polyamide active layer, wherein a content of the free chlorine is from 150 ppm to 400 ppm and a content of the halogen ion is from 150 ppm to 400 ppm based on the aqueous solution.

A water-treatment membrane is formed with a support layer and an active layer, and among these, a reverse osmosis membrane is a membrane separating a solvent and a solute using a reverse osmosis phenomenon. Flux and salt rejection of a water-treatment membrane are used as an important indicator presenting membrane performance, and such performance is greatly affected by an active layer of a polyamide structure produced by an interfacial polymerization method.

In view of the above, the inventors of the present disclosure have manufactured a water-treatment membrane increasing salt rejection and boron rejection of the membrane or enhancing flux while maintaining salt rejection by introducing free chlorine and a halogen element on an active layer in the water-treatment membrane.

According to one embodiment of the present specification, the free chlorine can be derived from hypochlorous acid, chlorous acid, chloric acid, perchloric acid and ions thereof, and can be used without limit as long as it is derived from a material capable of producing free chlorine.

According to one embodiment of the present specification, the halogen ion can mean an ion derived from group 17 elements of the periodic table other than chlorine (Cl). In other words, the halogen ion can be an ion of the remaining group 17 elements other than a chlorine ion.

According to one embodiment of the present specification, the halogen ion can include one or more of a bromine ion, an iodine ion and a fluorine ion.

According to one embodiment of the present specification, the halogen ion is preferably a bromine ion. Particularly, using an aqueous solution including free chlorine and a bromine ion can enhance salt rejection and boron rejection of a water-treatment membrane compared to using an aqueous solution including only iodine, or treating with an aqueous solution including only free chlorine and an iodine ion.

According to one embodiment of the present specification, the bromine can be derived from sodium bromide, potassium bromide, calcium bromide, magnesium bromide, ammonium bromide, lithium bromide, germanium bromide, cobalt bromide, strontium bromide, cesium bromide, tungsten bromide, copper(II) bromide, barium bromide and/or hydrogen bromide.

According to one embodiment of the present specification, an amount of the free chlorine in the aqueous solution can be from 150 ppm to 400 ppm based on the aqueous solution. When the amount of free chlorine satisfies the above-mentioned range, boron rejection of a water-treatment membrane can increase.

According to one embodiment of the present specification, an amount of the halogen ion in the aqueous solution can be from 150 ppm to 400 ppm based on the aqueous solution. When the amount of halogen ion satisfies the above-mentioned range, salt rejection and boron rejection of a water-treatment membrane can be enhanced.

According to one embodiment of the present specification, the aqueous solution including free chlorine and a halogen ion can have a pH of 4 to 11. By adjusting a concentration of the free chlorine and the halogen ion depending on the pH of the aqueous solution, a water-treatment membrane can be manufactured to have salt rejection, boron rejection, and/or flux properties proper for desired purposes. According to one embodiment of the present specification, the aqueous solution including free chlorine and a halogen ion can be brought into contact with the polyamide active layer for a time period of 5 seconds to 5 minutes, preferably for 10 seconds to 1 minute, and more preferably for 15 seconds to 30 seconds. When the contact time is shorter than 5 seconds, the effects of the free chlorine and the halogen ion on the polyamide active layer are insignificant, and when the contact time is longer than 5 minutes, time to stay on the polyamide active layer increases, and a membrane can be contaminated.

According to one embodiment of the present specification, immersion, spraying, coating, dropping or the like can be selected as the method of contacting, and preferably, immersion can be selected.

According to one embodiment of the present specification, the method for manufacturing a water-treatment membrane can further include providing the polyamide active layer on a porous support.

According to one embodiment of the present specification, a polymer material forming a coating layer on a nonwoven fabric can be used as the porous support. Examples of the polymer material can include one or more types selected from the group consisting of polysulfone, polyethersulfone, polycarbonate, polyethylene oxide, polyimide, polyetherimide, polyetheretherketone, polypropylene, polymethyl-pentene, polymethyl chloride, polyvinylidene fluoride and mixtures thereof, but are not limited thereto. Specifically, polysulfone can be used as the polymer material.

According to one embodiment of the present specification, the polyamide active layer can be formed through interfacial polymerization of an aqueous solution including an aromatic amine compound and an organic solution including a multifunctional acyl halide compound. Specifically, when bringing the aqueous solution layer including an aromatic amine compound into contact with the organic solution, the aromatic amine compound coated on the surface of the porous support and the multifunctional acyl halide compound react to produce polyamide through interfacial polymerization, and the result is adsorbed on the porous support to form a thin film. In the contact method, the polyamide active layer can also be formed using methods such as immersion, spraying or coating.

According to one embodiment of the present specification, before preparing a porous support and forming a polyamide active layer on the porous support, that is, before coating an aqueous solution including an aromatic amine compound and an additive on a porous support, coating an additive such as triethylammonium camphor sulfonate (TEACSA) can be included.

According to one embodiment of the present specification, the aromatic amine compound is not limited in the type as long as it is an aromatic amine compound used for water-treatment membrane manufacturing, but specific examples thereof can include one or more types selected from the group consisting of m-phenylenediamine (mPD), p-phenylenediamine, 1,2,4-benzenetriamine, 4-chloro-1,3-phenylenediamine, 2-chloro-1,4-phenylenediamine and mixtures thereof. Specifically, m-phenylenediamine (mPD) is preferred.

According to one embodiment of the present specification, an amount of the aromatic amine compound can be from 0.1 wt % to 15 wt % based on a total weight of the aqueous solution including the aromatic amine compound. Preferably, the amount can be from 0.1 wt % to 10 wt %. When the amount of aromatic amine compound satisfies the above-mentioned range, the reaction with the organic solution including a multifunctional acyl halide compound is stable when forming a water-treatment membrane active layer, and the aromatic amine compound can be stably dissolved in the aqueous solution.

According to one embodiment of the present specification, the aqueous solution including an aromatic amine compound can further include a surfactant.

In one embodiment of the present specification, the surfactant can be selected from among nonionic, cationic, anionic and amphoteric surfactants. According to one embodiment of the present specification, the surfactant can be selected from among sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide), alkyl polyglucosides such as octyl glucoside and decyl maltoside, fatty acid alcohols such as cetyl alcohol, oleyl alcohol, cocamide MEA, cocamide DEA, alkyl hydroxyethyldimethylammonium chloride, cetyltrimethylammonium bromide, cetyltrimethylammonium chloride, hexadecyltrimethylammonium bromide and hexadecyltrimethylammonium chloride, and alkyl betaines. Specifically, the surfactant can be SLS, octylphenol ethoxylates or ethoxylated nonylphenols.

According to one embodiment of the present specification, an amount of the surfactant can be from 0.005 wt % to 0.5 wt % with respect to the aqueous solution including the aromatic amine compound.

According to one embodiment of the present specification, the forming of the aqueous solution layer including an aromatic amine compound is not particularly limited, and any method capable of forming an aqueous solution layer on a porous support can be used without limit. Specifically, the method of forming the aqueous solution layer including an aromatic amine compound on the porous support can include spraying, coating, immersion, dropping and the like.

According to one embodiment of the present specification, the step of contacting with the aqueous solution layer can further go through a step of removing an excess aqueous solution including the aromatic amine compound as necessary. When the aqueous solution layer formed on the porous support has too much aqueous solution present on the support, the aqueous solution layer can be non-uniformly distributed, and when the aqueous solution is non-uniformly distributed, a non-uniform active layer can be formed by interfacial polymerization thereafter. Accordingly, an excess aqueous solution is preferably removed after forming the amine aqueous solution layer on the support. How the excess aqueous solution removal is performed is not particularly limited, but, for example, a sponge, an air knife, nitrogen gas blowing, natural drying, a press roll or the like can be used for the removal.

According to one embodiment of the present specification, the multifunctional acyl halide compound is not particularly limited, but, as an aromatic compound having 2 or 3 carboxylic acid halides, can be a mixture of one or more types selected from the group consisting of trimesoyl chloride (TMC), isophthaloyl chloride, terephthaloyl chloride, and mixtures thereof.

According to one embodiment of the present specification, an amount of the multifunctional acyl halide compound can be from 0.1 wt % to 0.5 wt % based on a total weight of the organic solution including the multifunctional acyl halide compound. The amount of multifunctional acyl halide compound satisfying the above-mentioned range is effective in preventing salt rejection and flux decreases in a finally manufactured membrane.

According to one embodiment of the present specification, organic solvents that do not participate in the interfacial polymerization reaction are preferred, and one or more types selected from among aliphatic hydrocarbon solvents such as freons and alkanes having 5 to 12 carbon atoms, and isoparaffin-based solvents that are alkane mixture materials can be included. Specifically, hexane, heptane, octane, nonane, decane, undecane, dodecane, cyclohexane, IsoPar (Exxon), IsoPar G (Exxon), ISOL-C(SK Chem), ISOL-G (Exxon) and the like can be used, however, the organic solvent is not limited thereto.

According to one embodiment of the present specification, the organic solvent can be included in an amount of 99.5 wt % to 99.9 wt % based on a total weight of the organic solution. The amount of organic solvent satisfying the above-mentioned range is effective in preventing salt rejection and flux decreases in a finally manufactured membrane.

One embodiment of the present specification provides a water-treatment membrane manufactured according the method for manufacturing a water-treatment membrane described above.

According to one embodiment of the present specification, the water-treatment membrane surface can include a bromine element.

According to one embodiment of the present specification, the water-treatment membrane surface can include a chlorine element.

According to one embodiment of the present specification, the water-treatment membrane can include a bromine element, but not include a chlorine element.

In the present specification, an elemental analysis can be conducted through an electron spectroscopy for chemical analysis (ESCA) method. Specifically, X-Ray photoelectron spectroscopy (XPS) can be used.

According to one embodiment of the present specification, the amount of bromine element can be greater than 0 at % and less than or equal to 5 at % in the elemental analysis conducted on the water-treatment membrane surface. Specifically, the amount can be greater than or equal to 0.88 at % and less than or equal to 4.7 at %.

According to one embodiment of the present specification, the amount of chlorine element can be greater than 0 at % and less than or equal to 1 at % in the elemental analysis conducted on the water-treatment membrane surface. Specifically, the amount can be greater than or equal to 0.5 at % and less than or equal to 0.6 at %.

According to one embodiment of the present specification, the water-treatment membrane surface may not include a chlorine element.

According to one embodiment of the present specification, a chlorine element cannot be detected in the elemental analysis conducted on the water-treatment membrane surface by a difference in the free chlorine reactivity depending on a pH of the aqueous solution including free chlorine and a bromine ion.

According to one embodiment of the present specification, when a chlorine element and a bromine element are detected in the elemental analysis conducted on the water-treatment membrane surface, the ratio of the bromine element with respect to the chlorine element (Br/Cl) can be from 5:1 to 10:1. When the ratio of the bromine element with respect to the chlorine element is less than 5:1, the free chlorine and the bromine ion cannot affect the active layer surface, and when the ratio of the bromine element with respect to the chlorine element is greater than 10:1, a non-uniform membrane can be formed on the active layer surface, and flux can decrease.

According to one embodiment of the present specification, when the amount of chlorine element is greater than 0 at % and less than or equal to 1 at % in the elemental analysis conducted on the water-treatment membrane surface, the ratio of the bromine element with respect to the chlorine element (Br/Cl) can be from 5:1 to 10:1.

According to one embodiment of the present specification, when the amount of chlorine element is greater than 0 at % and less than or equal to 1 at %, and the amount of bromine element is greater than 0 at % and less than or equal to 5 at % in the elemental analysis conducted on the water-treatment membrane surface, the ratio of the bromine element with respect to the chlorine element (Br/Cl) can be from 5:1 to 10:1.

According to one embodiment of the present specification, the ratio of the bromine element with respect to the chlorine element (Br/Cl) can be specifically from 6:1 to 10:1, and more preferably from 6.3:1 to 9.4:1.

According to one embodiment of the present specification, forming a protective layer by additionally coating a protective layer composition can be further included after the bringing of the aqueous solution including free chlorine and a halogen ion into contact with the polyamide active layer. The protective layer composition can include a hydrophilic material for increasing flux of the water-treatment membrane, but is not limited in the use as long as it is for increasing flux or durability of the water-treatment membrane.

FIG. 1 illustrates a water-treatment membrane according to one embodiment of the present specification. Specifically, FIG. 1 illustrates a water-treatment membrane consecutively provided with a nonwoven fabric (100), a porous support (200) and a polyamide active layer (300), and as salt water (400) flows into the polyamide active layer (300), purified water (500) is discharged through the nonwoven fabric (100), and concentrated water (600) is discharged outside failing to pass through the polyamide active layer (300). However, a structure of the water-treatment membrane according to one embodiment of the present specification are not limited to the structure of FIG. 1, and can further include additional constitutions.

According to one embodiment of the present specification, the water-treatment membrane can have a thickness of greater than or equal to 100 μm and less than or equal to 250 μm. The water-treatment membrane having a thickness of 100 μm or greater is effective in preventing flux and salt rejection decreases in the membrane, and the thickness being 250 μm or less is effective in preventing a salt rejection decrease in the membrane.

According to one embodiment of the present specification, the porous support can have a thickness of 60 μm to 150 however, the thickness is not limited thereto, and can be adjusted as necessary. In addition, a pore size of the porous support is preferably from 1 nm to 500 nm, but is not limited thereto.

According to one embodiment of the present specification, the water-treatment membrane can be used as microfiltration, ultrafiltration, nanofiltration, reverse osmosis or the like, and specifically, can be used as a reverse osmosis membrane.

Another embodiment of the present specification provides a water-treatment module including one or more of the water-treatment membranes described above.

Specific types of the water-treatment module are not particularly limited, and examples thereof can include a plate & frame module, a tubular module, a hollow & fiber module, a spiral wound module or the like. In addition, as long as the water-treatment module includes the water-treatment membrane according to one embodiment of the present specification described above, the water-treatment module is not particularly limited in other constitutions and manufacturing methods, and general means known in the art can be employed without limit.

Meanwhile, the water-treatment module according to one embodiment of the present specification has excellent salt rejection and flux, and has excellent chemical stability, and therefore, is useful in water-treatment systems such as household/industrial water-purification systems, sewage treatment systems or sea to fresh water treatment systems.

In addition, one embodiment of the present specification provides a water-treatment system including one or more of the water-treatment modules described above.

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

Example: Manufacture of Water-Treatment Membrane

Example 1

18 wt % of a polysulfone solid was introduced into N,N-dimethylformamide (DMF) and dissolved for 12 hours or longer at 80° C. to obtain a uniform liquid phase. This solution was cast to a thickness of 150 μm on a nonwoven fabric made of a polyester material and having a thickness of 95 μm to 100 μm. Then, the cast nonwoven fabric was placed in water to prepare a porous polysulfone support. After that, an aqueous solution including 5 wt % metaphenylenediamine (mPD) based on a total weight of the aqueous solution was coated on the porous polysulfone support to form an aqueous solution layer. Furthermore, an excess aqueous solution produced during the coating was removed using an air knife. On the aqueous solution layer, an organic solution including 0.3 wt % trimesoyl chloride (TMC) based on a total weight of the organic solution and an organic solvent (IsoPar G) was coated. Then, the result was dried at 95° C. until all liquid components evaporated, and then washed with pure water (DIW) to manufacture a water-treatment membrane.

The manufactured water-treatment membrane was immersed in an aqueous solution including 150 ppm of free chlorine and 200 ppm of a bromine ion for 20 seconds. Herein, the aqueous solution was adjusted to have a pH of lower than 7. After that, the membrane surface was dried to manufacture a water-treatment membrane.

Example 2

A water-treatment membrane was manufactured in the same manner as in Example 1 except that an aqueous solution including 300 ppm of the bromine ion instead of 200 ppm of the bromine ion was used.

Example 3

A water-treatment membrane was manufactured in the same manner as in Example 1 except that an aqueous solution including 400 ppm of the bromine ion instead of 200 ppm of the bromine ion was used.

Example 4

A water-treatment membrane was manufactured in the same manner as in Example 1 except that the aqueous solution including free chlorine and a bromine ion was adjusted to have a pH of higher than 7.

Example 5

A water-treatment membrane was manufactured in the same manner as in Example 2 except that the aqueous solution including free chlorine and a bromine ion was adjusted to have a pH of higher than 7.

Example 6

A water-treatment membrane was manufactured in the same manner as in Example 3 except that the aqueous solution including free chlorine and a bromine ion was adjusted to have a pH of higher than 7.

Comparative Example 1

18 wt % of a polysulfone solid was introduced into N,N-dimethylformamide (DMF) and dissolved for 12 hours or longer at 80° C. to obtain a uniform liquid phase. This solution was cast to a thickness of 150 μm on a nonwoven fabric made of a polyester material and having a thickness of 95 μm to 100 μm. Then, the cast nonwoven fabric was placed in water to prepare a porous polysulfone support. After that, an aqueous solution including 5 wt % metaphenylenediamine (mPD) based on a total weight of the aqueous solution was coated on the porous polysulfone support to form an aqueous solution layer. Furthermore, an excess aqueous solution produced during the coating was removed using an air knife. On the aqueous solution layer, an organic solution including 0.3 wt % trimesoyl chloride (TMC) based on a total weight of the organic solution and an organic solvent (IsoPar G) was coated. Then, the result was dried at 95° C. until all liquid components evaporated, and then washed with pure water (DIW) to manufacture a water-treatment membrane.

Comparative Example 2

The water-treatment membrane manufactured in Comparative Example 1 was immersed in an aqueous solution including 150 ppm of free chlorine for 20 seconds. The aqueous solution was adjusted to have a pH of lower than 7. After that, the membrane surface was dried to manufacture a water-treatment membrane.

Comparative Example 3

A water-treatment membrane was manufactured in the same manner as in Comparative Example 2 except that an aqueous solution including 300 ppm of the free chlorine instead of 150 ppm of the free chlorine was used.

Comparative Example 4

A water-treatment membrane was manufactured in the same manner as in Comparative Example 2 except that an aqueous solution including 400 ppm of the free chlorine instead of 150 ppm of the free chlorine was used.

Comparative Example 5

A water-treatment membrane was manufactured in the same manner as in Comparative Example 2 except that an aqueous solution including 150 ppm of a bromine ion instead of 150 ppm of the free chlorine was used.

Comparative Example 6

A water-treatment membrane was manufactured in the same manner as in Comparative Example 5 except that an aqueous solution including 300 ppm of the bromine ion instead of 150 ppm of the bromine ion was used.

Comparative Example 7

A water-treatment membrane was manufactured in the same manner as in Comparative Example 5 except that an aqueous solution including 400 ppm of the bromine ion instead of 150 ppm of the bromine ion was used.

Comparative Example 8

A water-treatment membrane was manufactured in the same manner as in Comparative Example 2 except that the aqueous solution including free chlorine was adjusted to have a pH of higher than 7.

Comparative Example 9

A water-treatment membrane was manufactured in the same manner as in Comparative Example 3 except that the aqueous solution including free chlorine was adjusted to have a pH of higher than 7.

Comparative Example 10

A water-treatment membrane was manufactured in the same manner as in Comparative Example 4 except that the aqueous solution including free chlorine was adjusted to have a pH of higher than 7.

Comparative Example 11

A water-treatment membrane was manufactured in the same manner as in Comparative Example 5 except that the aqueous solution including a bromine ion was adjusted to have a pH of higher than 7.

Comparative Example 12

A water-treatment membrane was manufactured in the same manner as in Comparative Example 6 except that the aqueous solution including a bromine ion was adjusted to have a pH of higher than 7.

Comparative Example 13

A water-treatment membrane was manufactured in the same manner as in Comparative Example 7 except that the aqueous solution including a bromine ion was adjusted to have a pH of higher than 7.

Comparative Example 14

The water-treatment membrane manufactured in Comparative Example 1 was immersed in an aqueous solution including 75 ppm of free chlorine and 50 ppm of a bromine ion for 20 seconds. Herein, the aqueous solution was adjusted to have a pH of lower than 7. After that, the membrane surface was dried to manufacture a water-treatment membrane.

Comparative Example 15

A water-treatment membrane was manufactured in the same manner as in Comparative Example 14 except that an aqueous solution including 100 ppm of the bromine ion instead of 50 ppm of the bromine ion was used.

Comparative Example 16

A water-treatment membrane was manufactured in the same manner as in Comparative Example 15 except that an aqueous solution including 150 ppm of the free chlorine instead of 75 ppm of the free chlorine was used.

Comparative Example 17

The water-treatment membrane manufactured in Comparative Example 1 was immersed in an aqueous solution including 75 ppm of free chlorine and 200 ppm of a bromine ion for 20 seconds. Herein, the aqueous solution was adjusted to have a pH of lower than 7. After that, the membrane surface was dried to manufacture a water-treatment membrane.

Comparative Example 18

A water-treatment membrane was manufactured in the same manner as in Comparative Example 17 except that the aqueous solution including free chlorine and a bromine ion was adjusted to have a pH of higher than 7.

In the examples and the comparative examples, adjusting the pH to higher than 7 means adjusting the pH to a range of 9 to 11, and adjusting the pH to lower than 7 means adjusting the pH to a range of 4 to 6.

Experimental Example: Performance Evaluation on Water-Treatment Membrane

For the water-treatment membranes manufactured in Examples 1 to 6 and Comparative Examples 1 to 18, device stabilization was confirmed through operating the device for approximately 1 hour using 32,000 ppm aqueous NaCl solution and 5 ppm aqueous boronic acid solution with 800 psi and 4.5 L/min flux, and flux (GFD, gallon/ft$^2$/day) was calculated by measuring the amount of water permeated for 10 minutes at 25° C., and salt rejection and boron rejection were calculated by analyzing the salt concentration before and after the permeation using a conductivity meter. The calculated results are described in the following Table 1.

In addition, results of elemental analysis (ESCA) on each of the membrane surfaces are described in the following Table 1. As the elemental analysis, X-ray photoelectron spectroscopy was used. The analysis was conducted on 3 spots or more per one sample while using Al Kα as the X-ray source, and one spot was scanned 20 times or more to collect data.

TABLE 1

| | Free Chlorine (ppm) | Bromine Ion (ppm) | pH | Membrane Properties | | | XPS Elemental Content (%) | | |
|---|---|---|---|---|---|---|---|---|---|
| | | | | Salt Rej. (%) | Flux (GFD) | Boron Rej. (%) | Br | Cl | Br/Cl |
| Example 1 | 150 | 200 | <7 | 99.96 | 8.32 | 96.2 | 3.8 | 0.6 | 6.3 |
| Example 2 | 150 | 300 | <7 | 99.96 | 7.87 | 96.8 | 4.2 | 0.6 | 7.5 |
| Example 3 | 150 | 400 | <7 | 99.96 | 7.31 | 96.9 | 4.7 | 0.5 | 9.4 |
| Example 4 | 150 | 200 | 7< | 99.90 | 15.97 | 93.7 | 0.88 | — | — |
| Example 5 | 150 | 300 | 7< | 99.92 | 14.56 | 94.5 | 0.98 | — | — |
| Example 6 | 150 | 400 | 7< | 99.93 | 13.69 | 94.8 | 1.23 | — | — |
| Comparative Example 1 | — | — | — | 99.86 | 16.54 | 91.6 | — | 0.3 | — |
| Comparative Example 2 | 150 | — | <7 | 99.88 | 14.33 | 91.7 | — | 1.1 | — |
| Comparative Example 3 | 300 | — | <7 | 99.88 | 13.87 | 91.7 | — | 1.4 | — |
| Comparative Example 4 | 400 | — | <7 | 99.86 | 14.41 | 91.3 | — | 1.5 | — |
| Comparative Example 5 | — | 150 | <7 | 99.85 | 15.88 | 90.7 | — | 0.2 | — |
| Comparative Example 6 | — | 300 | <7 | 99.83 | 16.71 | 91.1 | — | 0.1 | — |
| Comparative Example 7 | — | 400 | <7 | 99.88 | 14.98 | 90.4 | — | 0.1 | — |
| Comparative Example 8 | 150 | — | 7< | 99.84 | 14.59 | 91.3 | — | 0.4 | — |
| Comparative Example 9 | 300 | — | 7< | 99.83 | 15.82 | 91.3 | — | 0.5 | — |
| Comparative Example 10 | 400 | — | 7< | 99.83 | 16.26 | 91.4 | — | 0.4 | — |
| Comparative Example 11 | — | 150 | 7< | 99.85 | 16.97 | 91.2 | — | 0.2 | — |
| Comparative Example 12 | — | 300 | 7< | 99.83 | 14.51 | 91.1 | — | 0.3 | — |
| Comparative Example 13 | — | 400 | 7< | 99.86 | 15.67 | 91.4 | — | 0.2 | — |
| Comparative Example 14 | 75 | 50 | <7 | 99.89 | 16.20 | 92.4 | 1.2 | 0.8 | 1.5 |

TABLE 1-continued

| | Free Chlorine (ppm) | Bromine Ion (ppm) | pH | Membrane Properties | | | XPS Elemental Content (%) | | |
|---|---|---|---|---|---|---|---|---|---|
| | | | | Salt Rej. (%) | Flux (GFD) | Boron Rej. (%) | Br | Cl | Br/Cl |
| Comparative Example 15 | 75 | 100 | <7 | 99.93 | 11.06 | 95.2 | 2.3 | 0.6 | 3.83 |
| Comparative Example 16 | 150 | 100 | <7 | 99.95 | 10.81 | 94.7 | 2.9 | 1.0 | 2.9 |
| Comparative Example 17 | 75 | 200 | <7 | 99.93 | 10.87 | 93.4 | 3.2 | 0.3 | 10.7 |
| Comparative Example 18 | 75 | 200 | 7< | 99.87 | 15.12 | 91.7 | 0.75 | — | — |

Based on the results of Table 1, the water-treatment membranes according to Examples 1 to 3 had a high free chlorine content and a high bromine ion content compared to the water-treatment membranes according to Comparative Examples 14 to 16, and increases in the salt rejection (Salt Rej.) and the boron rejection (Boron Rej.) were identified. Particularly, based on the results obtained from the surface elemental analysis on the manufactured water-treatment membranes that the water-treatment membranes of Examples 1 to 3 had a Br/Cl ratio of 6.3 or higher, it was seen that having a free chlorine content and a bromine ion content at a certain level or higher affects membrane performance.

When comparing Examples 1 to 6 and Comparative Example 1, it was identified that salt rejection and boron rejection significantly increased when the polyamide active layer surface was treated with the aqueous solution of free chlorine and bromine ion according to Examples 1 to 6.

In addition, when comparing Examples 1 to 3 and Comparative Examples 2 to 7, it was identified that, when the pH of lower than 7 was used, salt rejection and boron rejection increased when treating the polyamide active layer with the aqueous solution including both free chlorine and a bromine ion compared to when treated with the aqueous solution including only free chlorine or treated with the aqueous solution including only a bromine ion.

Likewise, when comparing Examples 4 to 6 and Comparative Examples 8 to 13, it was identified that, when a pH of higher than 7 was used, salt rejection and boron rejection increased while maintaining flux when treating the polyamide active layer with the aqueous solution including both free chlorine and a bromine ion compared to when treated with the aqueous solution including only free chlorine or treated with the aqueous solution including only a bromine ion.

In addition, when comparing Example 1 and Comparative Example 17, it was identified that, when a pH of lower than 7 was used, boron rejection decreased in Comparative Example 17 having a free chlorine content of less than 150 ppm compared to Example 1 having a free chlorine content of 150 ppm or greater.

Likewise, when comparing Example 4 and Comparative Example 18, it was identified that, when a pH of higher than 7 was used, boron rejection decreased in Comparative Example 18 having a free chlorine content of less than 150 ppm compared to Example 4 having a free chlorine content of 150 ppm or greater.

According to Examples 1 to 6, it was identified that salt rejection and boron rejection of the membrane were enhanced as the bromine ion concentration in the aqueous solution increased, and according to property values of the water-treatment membranes according to Examples 1 to 6, it was identified that flux can be enhanced while reducing changes in the salt rejection and the boron rejection by adjusting a pH of the aqueous solution.

As a result, it was identified that the water-treatment membrane according to one embodiment of the present specification is capable of eventually enhancing salt rejection and boron rejection of the membrane by bringing an aqueous solution including free chlorine and a bromine ion each in a specific amount into contact with a surface of a polyamide active layer during a manufacturing process of the water-treatment membrane, and flux properties can also be adjusted by controlling a pH of the aqueous solution.

Hereinbefore, preferred examples of the present disclosure have been described, however, the present disclosure is not limited thereto, and various modifications can be made within the scope of the claims and the detailed descriptions of the disclosure, and these also fall within the category of the present disclosure.

The invention claimed is:

1. A method for manufacturing a water-treatment membrane, comprising:
    bringing an aqueous solution including free chlorine and one or a combination of sodium bromide, potassium bromide, calcium bromide, magnesium bromide, ammonium bromide, lithium bromide, germanium bromide, cobalt bromide, strontium bromide, cesium bromide, tungsten bromide, copper(II) bromide, barium bromide or hydrogen bromide to yield a bromine ion into contact with a polyamide active layer on a porous polysulfone support for a contact time of from 15 seconds to 30 seconds, wherein an amount of the free chlorine is from 150 ppm to 400 ppm and an amount of the bromine ion is from 150 ppm to 400 ppm based on the aqueous solution;
    wherein the water-treatment membrane has a bromine element content of greater than 0 at % and less than or equal to 5 at %, a chlorine element content of greater than 0 at % and less than or equal to 1 at %, and a ratio of the bromine element to the chlorine element (Br/Cl) is from 5:1 to 10:1 when measured using an electron spectroscopy for chemical analysis (ESCA) elemental analysis on a surface of the water-treatment membrane using X-ray photoelectron spectroscopy.

2. The method of claim 1, wherein the aqueous solution including free chlorine and the bromine ion has a pH of 4 to 11.

3. A water-treatment membrane having a bromine element content of greater than 0 at % and less than or equal to 5 at % when measured using an electron spectroscopy for chemical analysis (ESCA) elemental analysis on a surface of the water-treatment membrane using X-ray photoelectron spectroscopy,
wherein:
the membrane has boron rejection of 93.7% to 96.9% and a salt rejection of 99.90% to 99.96%;
a chlorine element content is greater than 0 at % and less than or equal to 1 at %, and a ratio of the bromine element to the chlorine element (Br/Cl) is from 5:1 to 10:1.

4. A water-treatment module comprising one or more of the water-treatment membranes of claim 3.

5. A water-treatment system comprising one or more of the water-treatment modules of claim 4.

6. The method of claim 1, wherein the membrane has a salt rejection of 99.90% to 99.96%.

7. The method of claim 1, further comprising drying a surface of the polyamide active layer after the polyamide active layer is brought into contact with the aqueous solution containing free chlorine and a bromine ion to produce a dried polyamide active layer.

8. The method of claim 7, further comprising forming a protective layer by coating a protective layer composition comprising a hydrophilic material onto the dried polyamide layer.

* * * * *